United States Patent [19]

Yoshikawa

[11] Patent Number: 4,730,576
[45] Date of Patent: Mar. 15, 1988

[54] SMALL ANIMAL WASHING AND DRYING APPARATUS

[76] Inventor: Kenji Yoshikawa, 546-5, Akeminosato-cho, Daito, Japan, 574

[21] Appl. No.: 854,772

[22] Filed: Apr. 22, 1986

[30] Foreign Application Priority Data

Apr. 27, 1985 [JP] Japan .............................. 60-63777[U]

[51] Int. Cl.⁴ ............................................. A01K 13/00
[52] U.S. Cl. .......................................... 119/158; 4/568
[58] Field of Search .................... 119/158, 159, 29, 1; 4/637, 654, 656, 657, 661, 492, 493, 507, 568

[56] References Cited

U.S. PATENT DOCUMENTS

| | | | |
|---|---|---|---|
| 2,611,341 | 9/1952 | Paris | 119/158 |
| 2,661,865 | 12/1953 | Wendt | 119/158 X |
| 4,056,048 | 11/1977 | Blafford et al. | 119/158 |
| 4,083,328 | 4/1978 | Baker | 119/158 |
| 4,197,815 | 4/1980 | Brazelton | 119/158 X |
| 4,379,438 | 4/1983 | Pearden | 119/29 |
| 4,456,174 | 6/1984 | Neenan | 4/568 X |
| 4,505,229 | 3/1985 | Altissimo | 119/158 |
| 4,549,502 | 10/1985 | Namdari | 119/158 |

Primary Examiner—William F. Pate, III
Assistant Examiner—Creighton Smith
Attorney, Agent, or Firm—Darby & Darby

[57] ABSTRACT

Washing tub into which small animal is put is almost shut with extruding a head of small animal through a head opening, and the small animal is washed and dried by jet water current and warm air in the washing tub, and further height of a footing board can be adjusted depending on height of small animal, a filter is disposed to a drain port, therefore, various small animals are washed efficiently and sanitarily without taking human hands.

11 Claims, 13 Drawing Figures

SMALL ANIMAL WASHING AND DRYING APPARATUS

BACKGROUND OF THE INVENTION AND RELATED ART STATEMENT

1. Field of the Invention

The present invention relates generally to apparatus for washing and drying small animals such as pet animals or laboratory animals, and particularly pertains an apparatus by which the small animal can be washed and dried automatically and sanitarily without taking skilled human hands.

2. Description of the Related Art

Hitherto, a small animal such as dog or cat has been generally washed by putting them into bath, and brushing by human hands.

However, the small animals are not accustomed to water whether it is cold or warm, and so they often struggle while they are washed. Therefore, washing of the small animal is much troublesome, and human clothing is soiled. And further, when the small animal is washed in a bathroom, hair fallen out from the animal chokes a drain port, and further it becomes unsanitary. After washing hair a small animal should be wiped with a dry cloth. After that, if necessary, the animal should be dried by a dryer. Therefore,

OBJECT AND SUMMARY OF THE INVENTION

The present invention is intended to solve the above-mentioned problem of the prior art, and the purpose of the present invention is to obtain a small animal washing and drying apparatus whereby almost all necessary functions for washing of small animal are satisfied, and small animal can be washed regardless of their shoulder, height and, even if they rather struggle, washing water is not scattered out of the washing tub.

The apparatus for washing and drying small animal of the present invention comprises, a washing tub having at least one jet water current generator and at least one warm air outlet connected to a heating device, which are disposed at an upper part of inner side wall, and a drain port having a filter disposed at the bottom part of the washing tub, an outer case contains said washing tub, a footing board installed at a lower part of the washing tube by a level adjusting member for mounting the footing board in vertically adjustable level, a movable lid disposed on opening of the washing tub, said movable lid having a notch as a opening through which head of the small animal is extruded, and a top panel disposed on the opening of the washing tube, said top panel having a notch which is opposite to the notch formed to the movable lid in a manner to constitute the opening through which head of the small animal is sticked by combination with the notch of the movable lid.

BRIEF DESCRIPTION OF THE DRAWINGS

FIGS. 5 (a), (b) and (c) are schematic diagrams showing operation of construction of FIG. 4.

DESCRIPTION OF THE PREFERRED EMBODIMENTS

Embodiment in accordance with the present invention is described with reference to FIGS. 1, 2, 3, 4, 5, 6, 7, 8, 9, 10 and 11.

Figure 1:
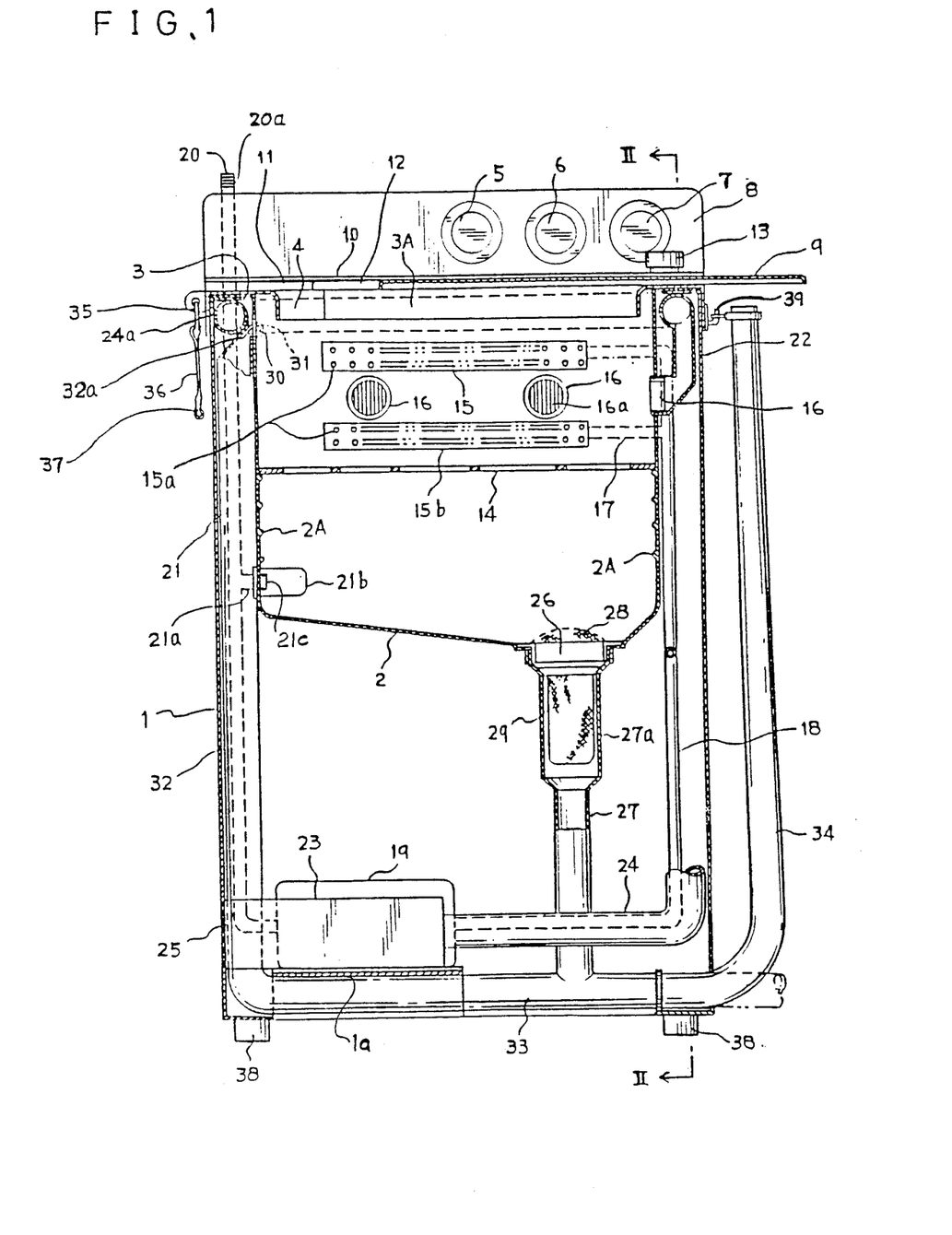
FIG. 1 is a front sectional view showing a small animal washing apparatus as a preferred embodiment of the present invention.
Figure 2:
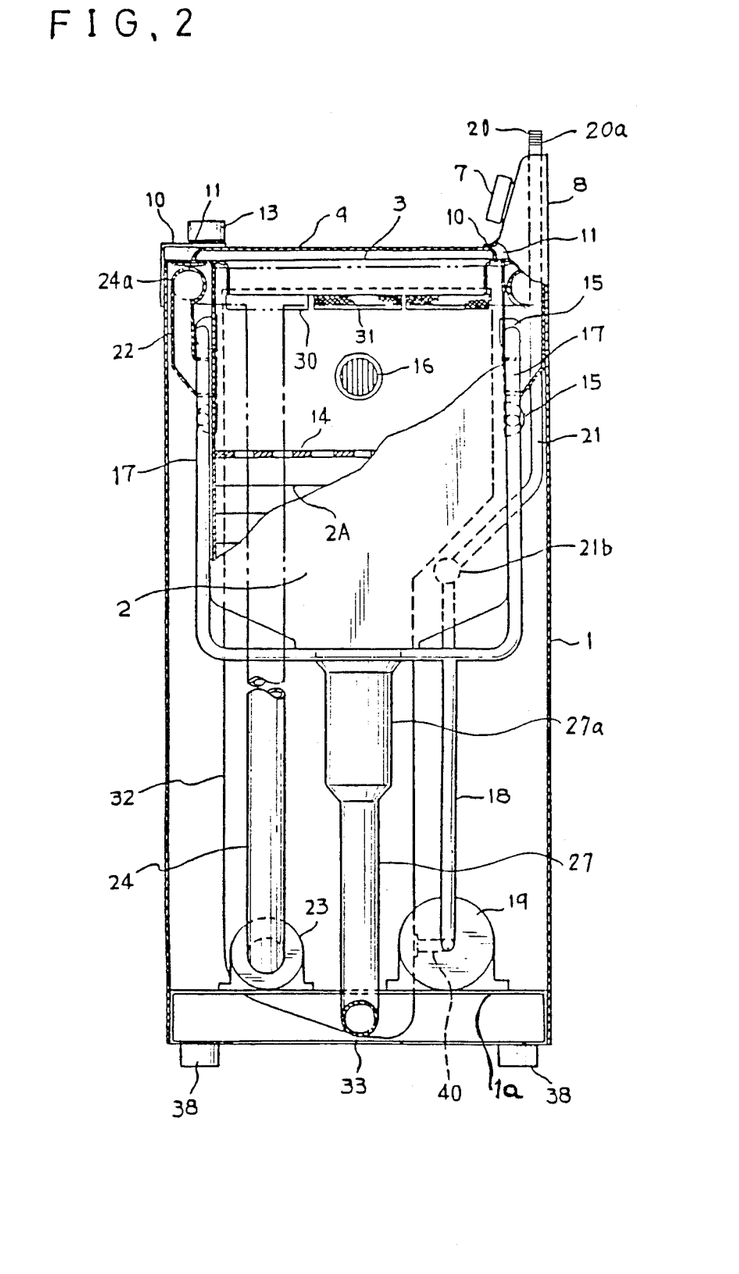
FIG. 2 is a partly sectional view taken on line 2—2 of FIG. 2.
Figure 3:
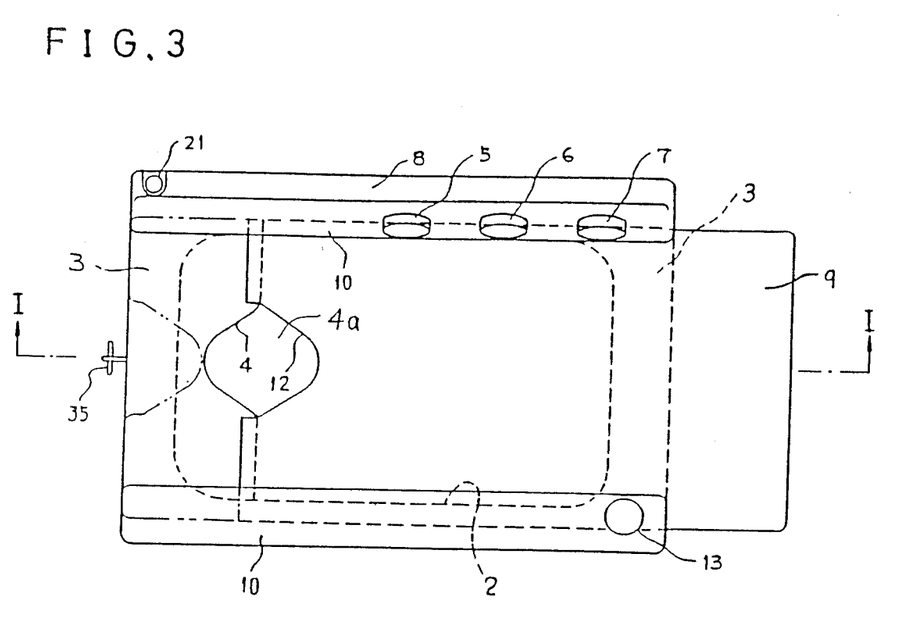
FIG. 3 is a plan view showing a small animal washing apparatus as preferred embodiment of the present invention.

In the present invention, a washing tub 2 is installed in an outer case 1, and a footing board 14 such as a lattice board, a wire netting or a punching metal is disposed to lower part of the washing tub 2 in such manner that it can be shifted to various level positions in a range of from middle to the bottom part of the washing tub 2. Plural jet water outlet ports 15a and warm air outlet ports 16 are disposed at upper part of inner side of the washing tube 2. The jet water outlet ports 15a are connected to a water supply pressure pump 19, and warm air outlets 16 are connected to a heating device 23. A drain port 26 having a detachable filter is disposed to the bottom part of the washing tub 2. A movable lid 9 for covering opening of the washing tub 2 is disposed to upper part of the washing tub 2, and a notch 12 is disposed to an end of the movable lid 9. And furthermore, a notch 4 is disposed to an end of a top panel 3 located under the movable lid 9, and head-opening port 4a, through which head of the small animal is sticked out, is formed by both of the notches 4 and 12.

In case that the small animal such as dog or cat is washed, level of the footing board (14) is adjusted depending on sholder height of the small animal, and level of cold or warm water in the tub 2, and if necessary cleansing agent are charged into the washing tub 2. Thereafter, the small animal is put into the washing tub 2, and movable lid 9 is put on the opening part of the washing tub 2. At this time, the head of the small animal is sticked out from the head-opening 4a. Spacing between neck of the small animal and the head-opening 4a is rather small. Therefore, even if the small animal struggles, washing water is hardly scattered out of the washing tub 2.

Next, by operating the water supply pressure pump 19, jet water current is made to spout out from the jet water current output ports 15a. Thus the water in the washing tub 2 is stirred and, the jet water current is made to act on hair of the small animal to wash them. Jet water current may be made only by circulating the water containing cleansing agent in the washing tub 2, or by supplying fresh water continuously without the circulation of water, depending on situation. Waste water in the washing tub 2 is drained through the drain port 26, when the washing is finished. But, there is no fear that drain pipe is choked up by fallen out hair of the small animal, since a filter is disposed to the drain port 26. After the draining, wet hair of the small animal can be dried promptly by operating the heating device 23 to supply warm air to the washing tub 2.

EXAMPLE

In the following, a detailed embodiment in accordance with the present invention is explained.

The washing tub 2 disposed in the outer case 1 is formed in such manner that its size is somewhat smaller than the outer case 1, so as to give a gap between inside of the outer case 1 and the outside of the washing tub 2. The washing tub 2 is made in a box shaped, and further its upper part is open. Top panel 3 has opening 3a at the center of it, and size of the opening is a little smaller than the opening of the washing tub 2. Peripheral edges of opening 3a protrudes toward center of the opening of the washing tub 2. And further, a notch 4 is provided at a center part of a perpendicular side edge of the top panel 3. While edges of the opening of the top panel 3 are bent to downward, and the above-mentioned edges reach more lower position than the opening end of the washing tub 2.

An operating panel 8 is formed at an upper and rear part of the outer case 1. A washing switch 5, water supply switch 6 and drying switch 7 are disposed on the operating panel 8. These switches control start or stop of respective devices connected to the switches. Closing board 9 is of flat board shaped, and mounted detachablly or slidably in left and right direction along with guide grooves 11, 11. The guide grooves 11, 11 are formed between a top panel 3 and a guide 10 attached at front lower edge of the operation panel 8, and between the guide 10 attached to front part of the outer case 1 and upper surface of top panel 3. A notch 12 is disposed to an edge of the movable lid 9, this edge opposites to the notch 4 on the top panel 3. Making to face the notches 4 and 12 each other, head-opening 4a is formed, and, all other opening part of the washing tub 2 is closed. Size of the head-opening 4a can be changed freely by sliding the movable lid 9 along the guide grooves 11 11.

The movable lid 9 is screwed with the front guide 10 by lock nut 13, and the lower end of the lock nut 13 presses top surface of the movable lid 9 to prevent sliding of it.

Footing board, such as lattice board 14, is disposed in the washing tub 2, and each side of the lattice board is slightly smaller than that of cross section in horizontal direction of the washing tub 2. But both sizes are almost the same, so that substantially no gap between the footing board 14 and wall of the washing tub 2 is made. The footing board 14 is installed in the washing tub 2 in such manner that it can be shifted to plural positions in a range from a middle part to the bottom part of the washing tub 2, embodily, plural protuberances 2a are formed in vertical row on the side wall of the washing tub 2 as footing board stoppers (Four steps of stopper are shown in FIG. 2).

Group of a pair of upper and lower jet water current outlets 15 is disposed on the front and rear wall of the washing tub 2, and its position is upper than middle of the washing tub 2. The jet water current output group 15 is formed by making jet hole 15a on a vertical wall of a pipe 15b having D shaped sectional figure. The jetting holes 15a are arranged in double lines of upper and lower. And, the above-mentioned vertical wall is in one plane with the side wall of the washing tub 2.

Warm air output ports are disposed between upper and lower jet water current output ports 15. Front and rear walls for the washing tub 2 have respectively two warm air outlets on its right and left parts, and right and left walls of the washing tub have respectively single warm air outlet on it center part. And further, the warm air outlet 16 has many vertical fins 16a at opening formed on the wall of the washing tub 2, to control flowing direction of warm air.

The jet water current output pipe 15b is connected to pressurized water supply pipe 17, and further, the water supply pipe 17 is connected to a main water supply pipe 18 which is connected to a water supply pressure pump 19 provided on a stand (1a). Suction port of the water supply pressure pump 19 is connected to a water supply pipe 21, and the other end of the water supply pipe 21 is connected to a water having a connector 20a being a screw. A water supplying port 21c having a filter 21b through which water is supplied to the washing tub 2 is provided at lower position than the footing board stopper 2a. And further, a branch water supply pipe 21a is provided at a midway part of the water supply pipe 21 to connect it to the water supplying port 21b.

The warm air outlets 16 are respectively connected to air supply pipes 22. Each supply pipes 22 is connected with main air supply pipe 24 through distributing pipe 24a. The main air supply pipe 24 is connected with the heating device 23 installed on stand. The heating device 23 has a electric heater and a fan (not shown in FIG. 1-10), and heats outsider air sucked through outer air intake 25 disposed in the outer case 1. The heated air is made to spout to the washing tub 2 through the main air supply pipe 24 and air supply pipe 22. And further, it is possible and convenient that a heater of the heating device 23 is turned off or on by well known means independently from the spouting, so that warm or cool air can be supplied depending on necessity.

A drain port 26 is disposed to the bottom of the washing tub 2 and connected with a drain pipe. A rough filter 28 is disposed detachably on the drain port 26. And further, a cylindrical fine filter having a bottom is inserted to a filter holder 27a disposed at the connection part of the drain port 26, and the drain pipe 27 and the drain pipe 27. Fallen out hair or the like are filtrated by the above-mentioned two kinds of the filter, and therefore, clogging of the drain pipe or the like is not caused.

Three rectangular upper drain ports 30 are disposed in horizontal line at the upper part of left side wall (on which side, the notch 4 of the top panel 3 exists) of the washing tub 2. And a filter 31, which is detachably inserted to the each upper drain port 30, are connected to an upper opening 32a of a drain tank 32, which is installed in a space between the outer case 1 and the washing tub 2. The drain tank 32 has nearly the same size as width of right or left side of the washing tub 2 so as to drain soiled water rapidly. Lower part of the drain tank 32 is connected with main drain pipe 33, and the above-mentioned drain pipe 27 is connected with midway part of the main drain pipe 33. And further, another end of the main drain pipe 33 is connected with flexible drain hose 34.

A ring 35 for fixing a collar of small animal is provided at the left side wall of the outer case 1. In this side there is the head-openings 4a. A connecting means such as chain, rope, coil or spring which has a hanger 37 at its another end is connected to the ring 35. A motion of head of small animal is restrained by connecting the hanger 37 to the collar of small animal.

Furthermore, rubber legs 38 is provided at four corners of underside of the outer case 1, and a hose hanger 39 is provided at the right side wall of the outer case 1.

Figure 4:
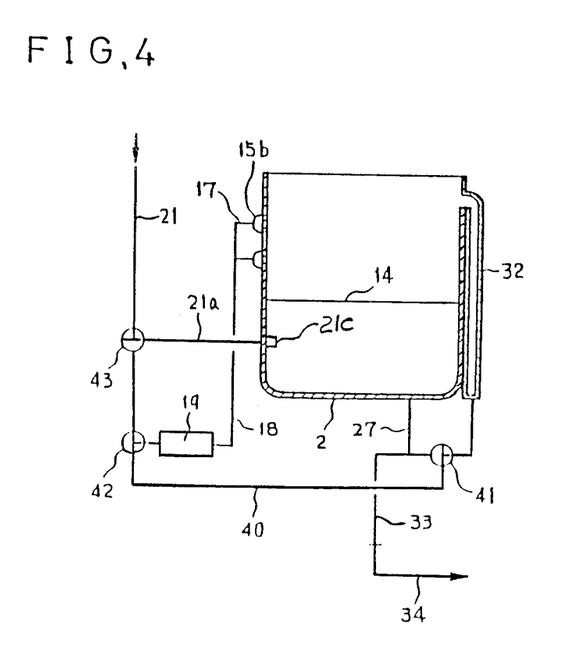
FIG. 4 is a connection diagram showing current of water supplying and drawing as a preferred embodiment of the present invention.

Next, more concrete water supplying and draining system as an embodiment of the present invention is described with reference to FIG. 4. An end of water circulation pipe 40 is connected by a value 41 to the main drain pipe 33 at a position of upper stream to a connection part of the main drain pipe 33 and the drain pipe 27, and the other end of the water circulation pipe 40 is connected by a three-way valve 42 to a water supply pipe 21 at a position between a connection part 43 of water supply pipe 21 and branch water supply pipe 21a and a water supply pressure pump 19. Cross valves are provided at respective connection parts of the water circulation pipe 40 and the main drain pipe 33, and the water circulation pipe 40 and the water supply pipe 21. And further, a cross valve is provided at a connection part of the water supply pipe 21 and the branch water supply pipe 21a. Although the above-mentioned valves may be of manual operation type, it is possible and more convenient to use magnetic valves linked with the switches 5, 6 and 7 in a manner to be controlled thereby.

In the following, operation of the above-mentioned construction of an embodiment is explained with reference to FIGS. 1 to 6.

First, a drain hose 34 is hung to drain hose hanger 39, and connector 20a of water inlet 20 is connected with a faucet. At this time the above-mentioned valves 41, 42 and 43 are respectively set up in the states of FIG. 4. That is, the water supply pipe 21 is connected with the branch water supply pipe 21a, and further a drain tank 32 is connected with the circulation pipe 40 which is connected with the water supply pressure pump 19.

Figure 5A:
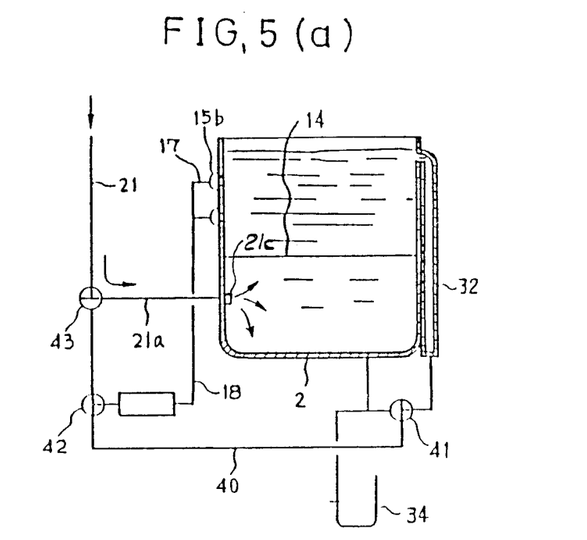

Under the above-mentioned state, by pushing the water supply switch 6, water is supplied to the washing tub 2 from the faucet, through the water supply pump 19, valve 43 and branch water supply pump 21, valve 43 and branch water supply pipe 21a. In this case, water is filled not only in the washing tub 2, but also in the drain tank (FIG. 5A). But it is desirable that water level is kept at nearly upper edge of the upper drain port 30.

When the water supplying is finished, a small animal to be washed to put in the washing tub 2 with its head sticking up through the notch 4 of top panel 3. Next, by sliding the movable lid 9, size of the head opening 4a formed by notches 4 and 12 of the top panel 3 and movable lid 9 is adjusted corresponding to the neck size of the small animal. And then, the movable lid 9 can be fixed by screwing the lock nut (FIG. 6) putting the small animal with its head only out of the washing tub 2 through the head opening 4a.

Figure 5B:
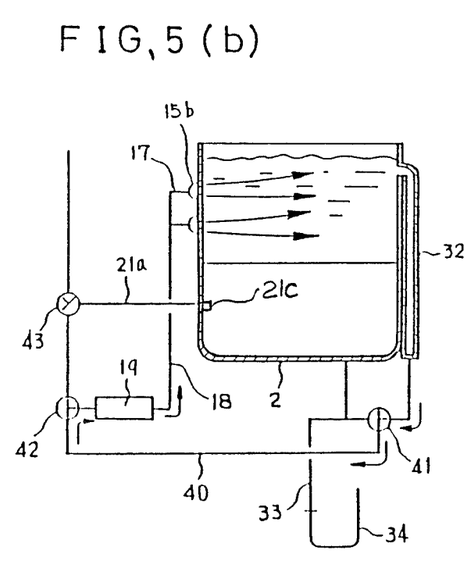

Next, the valve 43 is closed by turning the water supply switch 6 off, and thereby, a connection between the water supply pipe 21 and the branch water supply pipe 21a is cut. Consequently, water supply is cut off. Then, by turning the washing switch 5 on, the water supply pump 19 is operated and pressurized water is supplied to the jet water current output pipe 15b through the main water supply pipe 18 and pressurized water supply pipe 17. Thus, jet water current is supplied to the washing tub 2 through the jet water current output port 15a. By the jet water current, water in the washing tub 2 is stirred and mixed with cleansing agent, and the washing water reaches aciculum and further skin, thereby washing them. And further, the washing water is made to circulate by the water supply pressure pump 19 through a circulation passage in the order of form the main water supply pipe 18, through pressurized water supply pipe 17, jet water current output pipe 15b, jet water current output port 15a, washing tub 2, drain tank 32, main drain pipe 33 and valve 41 to water circulation pipe 40 (FIG. 5 B).

Figure 5C:
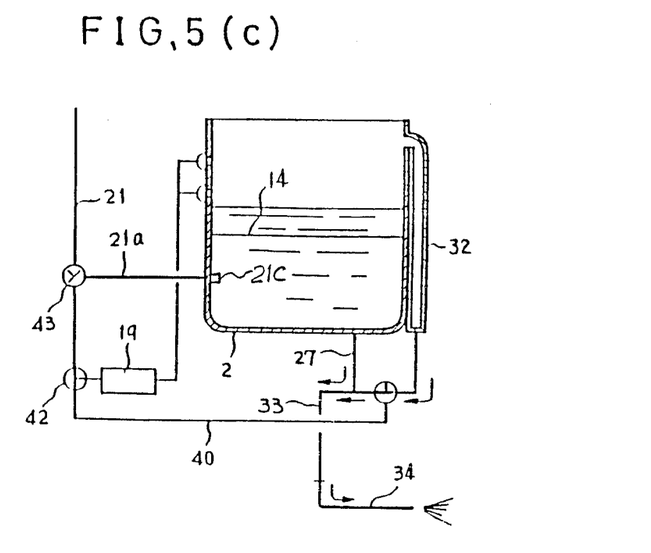
Figure 6:
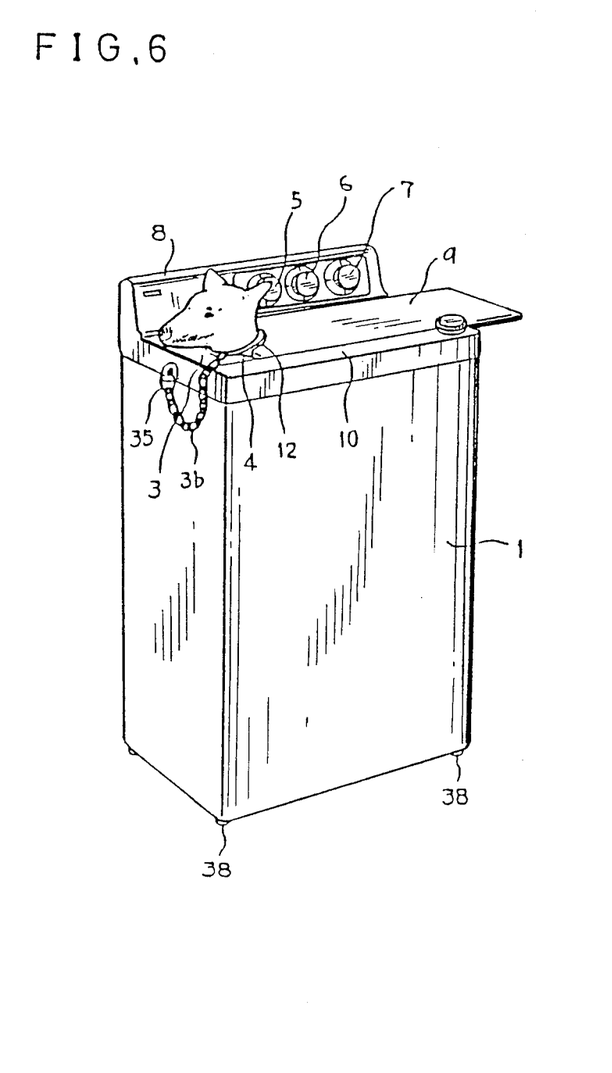
FIG. 6 is a perspective view showing an operating state of small animal washing apparatus as an embodiment of the present invention.

When the washing of the small animal is finished, by turning the washing switch 5 off, the operation of the water supply pressure pump 19 is stopped. Then, the drain tank 32 is made to connect with the main drain pipe 33 by switching the valve 41, and further a drain hose 34 is taken off from the drain hose hanger 39. And then, waste water in the washing tub 2 and the drain tank is drained from the drain hose 34 through the drain pipe 27 and main drain pipe 33 (FIG. 5 C). At this time, fallen out hair or the like in the waste water is filtrated by a two step filter comprising a rough filter 28 and a fine filter. And thereby the waste water can be drained smoothly without clogging the drainage or sewage.

When the draining of the water is finished, the drain hose 34 is hanged again to the drain hose hanger 39, as shown in FIG. 5A and the water supply switch 6 is switched to make connection between the water supply pipe 21 and the branch water supply pipe 21a, and further to make a connection between the drain tank 32 and the circulation water pipe 40. Thereafter, water is supplied again from the water supplying pipe 21 to the washing tub 2, and further the drain tank 32 is filled up again with water. Next, by turning the washing switch 5 on, as shown in FIG. 5B the water supply pressure pump 9 is operated. And thereby, jet water current is spouted to the washing tub 2 in the same manner as mentioned above, and water in the washing tub 2 is circulated and stirred. Therefore, cleansing agent, bubble and filth which are on the hair of the small animal are washed away. The above-mentioned rinse is preferably repeated several times depending on situation in the same way as mentioned above. And furthermore, rinse agent may be added in the middle of the above-mentioned rinsing.

After the rinse and the drainage of water in the washing tub 2 and the drain tank 32 are finished, the heating device 23 is operated by turning the drying switch 7 on. Then, warm air heated by the heater is supplied from respective warm air outlets 17 to the washing tub 2 through the main air supply pipe 24, distribution pipe 24a and air pipe 22. Thereby, wet hair of the small animal is dried. Then, the drying switch 7 is turned off again to stop operation of the heating device 23, and consequently, supplying of warm air is stopped.

Figure 7:
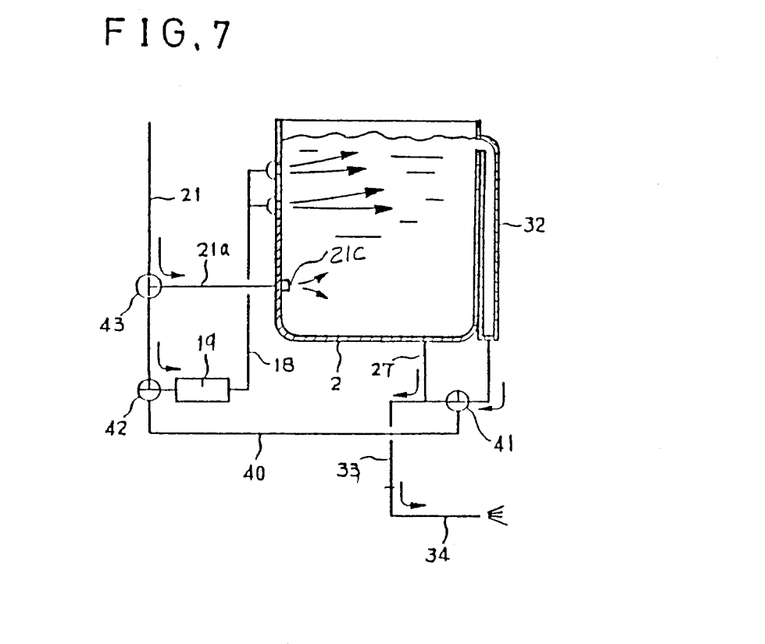
FIG. 7 is a schematic diagram showing an operation of apparatus of another embodiment of the present invention.

In the above-mentioned embodiment, continuous rinsing by fresh water becomes as follows: By changing the valves 43, 42 and 41, as shown in FIG. 7, connections of the water supply pipe 21 and the branch water supply pipe 21a, the water circulation pipe 40 and the water supplying pressure pump 19, and of the drain tank 32 and the water circulation pipe 40 are cut off. On the other hand, connections of the water supplying pipe 21 and the water supply pressure pump 19, and of the drain tank 32 and the main drain pipe 33 are respectively made. And then, the drain hose 34 is put off from the drain hose hanger 39 to make preparation of draining water. Thereafter, the water supply pressure pump 19 is poerated.

Various kinds of materials, such as wood, plastic, metal or the like can be used for the footing board. And further, whatever shape it may have so long as water can pass downward therethrough, any board such as lattice board, punching board, slatted board can be used for the footing board. Moreover, even wire netting or the like can be used. For material of the main body of the apparatus, metal, plastic and enamelled material or the like can be used.

Figure 8:
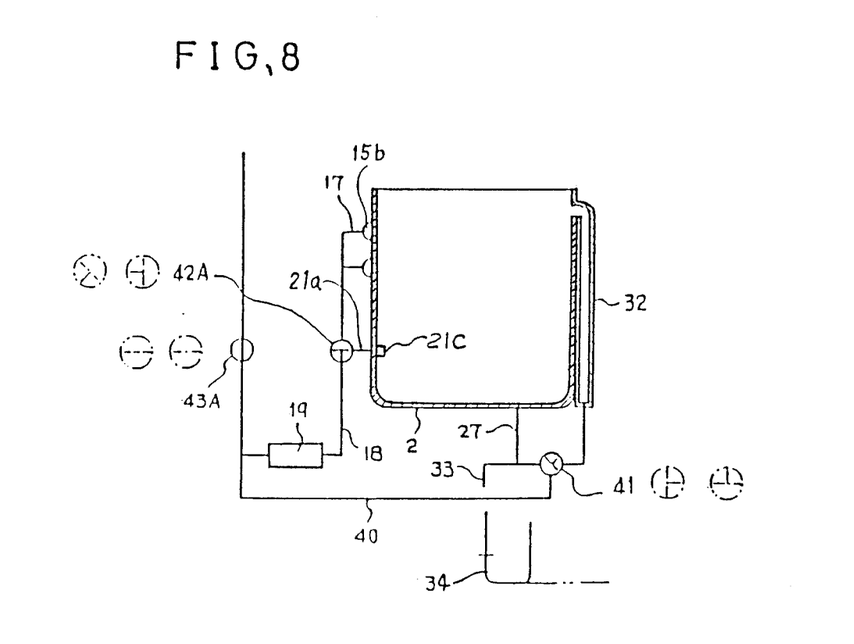
FIG. 8 is a schematic diagram showing modified means for water supply and drainage.

FIG. 8 shows another embodiment of the concrete constitution of water supply and drainage system. The construction of the FIG. 8 is different from the constitution of FIG. 4 in that the branch water supplying pipe 21a is divided from the main water supply pipe 18. And further a stop valve 43A is provided in the water supply pipe 21, and across valve 42a is provided at a connection part of the branch water supply pipe 21a and the main water supply pipe 18. The water circulation pipe 40 is directly connected to the water supply pressure pump 19 at the part donstream of the valve 43A.

In FIG. 8, solid lines show the states of the values of water supplying stage, and drain lines show the washing or rinse stage. And further, the drain line shows the draining water stage.

Figure 9:
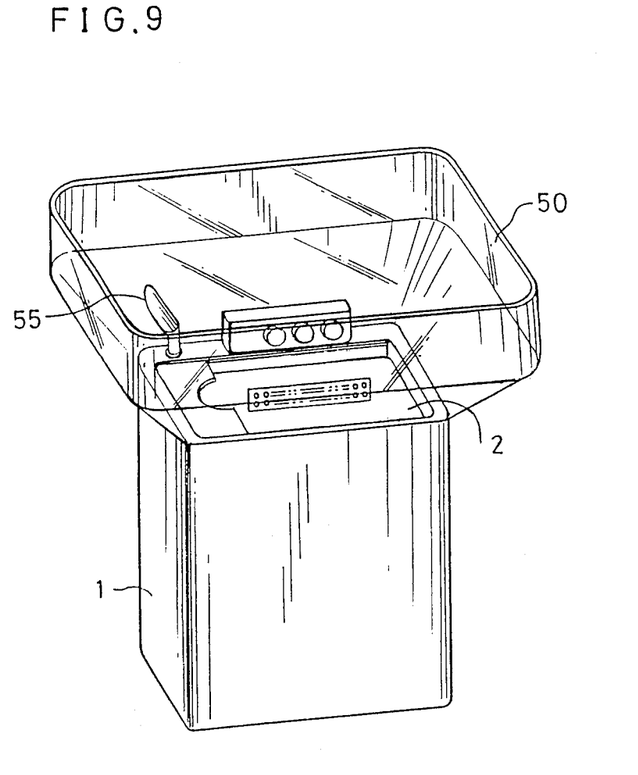
FIG. 9 is a perspective view showing an apparatus as another embodiment of the present invention.

FIG. 9 shows still another embodiment of the present invention. In this embodiment, outer shield 50 made of plastic is disposed to the upper part of outer case 1 in a manner to enclose the top part of the outer case 1. The outer shield 50 receives scattered drops of washing water, cleansing agent and hair during the washing of the small animal, and flow back them to the washing tub 2. Therefore, washing water or the like are not scattered out of the apparatus. And further the outer shield 50 may be covered by outer lid 54. For the outer shield 50, various kind of materials such as plastic, metal or wood can be used.

Additionally, a showering device for shampooing head of the small animal may be provided in the shield 50.

Figure 10:
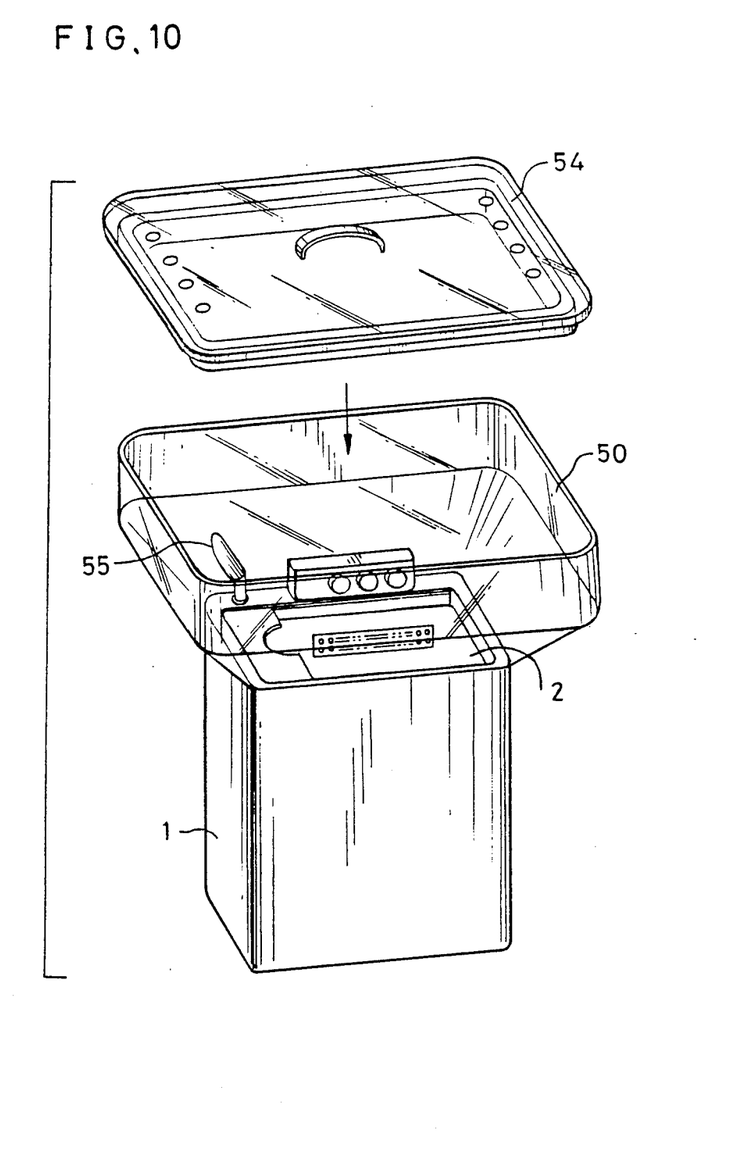
FIG. 10 is a perspective view showing a modified embodiment wherein the top of said outer case is covered by outer shield and outer lid.
Figure 11:
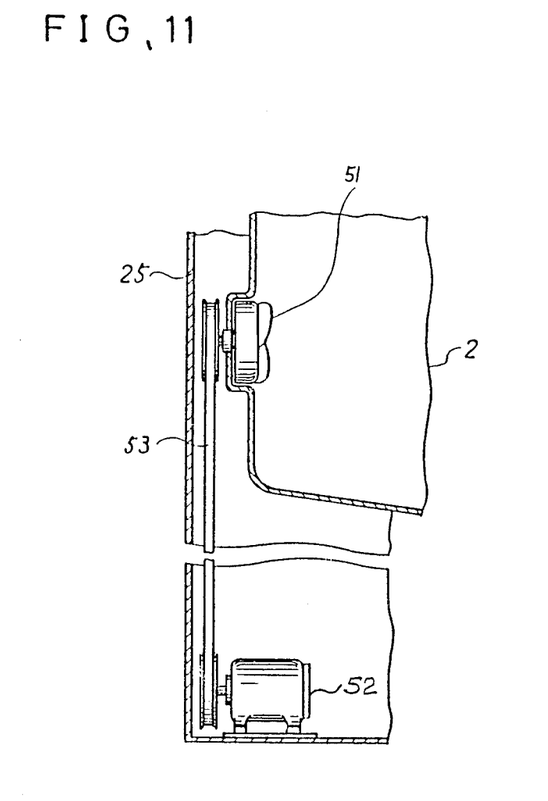
FIG. 11 is a sectional view showing a pulsator for generating jet water current in an embodiment of the present invention.

As the for jet water current generation device, at least a pulsator 51 which is driven by electric motor 52 through belts 53 may be used as shown in FIG. 10. It is preferable that one pulsator 51 is disposed on the left side wall of the washing tub 2 (the side having the head opening 4a), each one the pulsator is disposed in the front and rear wall of the washing tub 2, and one or two pulsators are disposed on the right side wall of the washing tub 2.

As mentioned above, in the small animal washing apparatus of the present invention, the small animal is washed and dried automatically in the washing tub 2. Therefore, washing of the small animal does not take trouble, and human clothing and bathroom or the like are not soiled. Further, fallen out hair is not dispersed around the room, and not discharged together with soiled water since they are filtrated by the filter 29 disposed at the drain port 26. Moreover, the apparatus is usable for washing and drying various small animals that are different each other in his height, since the level or height of the footing board 14 can be adjusted depending on the height of the small animal.

What is claimed is:

1. A small animal washing and drying apparatus, comprising
   a washing tub having at least one jet water current generator and at least one warm air outlet connected to a heating device disposed at an upper part of inner side wall, a drain port having a filter disposed at the bottom part of the washing tub,
   an outer case containing said washing tub,
   a footing board installed at a lower part of the washing tub by a level adjusting member for mounting the footing board at a level adjustable in the substantially upright direction,
   a movable substantially horizontal lid disposed on an opening of the washing tub, said movable lid having a first notch as an opening adapted to closely receive at least a portion of a head and neck of a small animal, and
   a top panel disposed on the opening of the washing tub, said top panel having a second notch adapted to closely receive at least a portion of the head and neck of the small animal, said second notch positioned opposite to and defining with said first notch in a working condition of the apparatus an opening for close receiving the head and neck of the small animal, wherein the head of the small animal is positioned outside of the apparatus and the rest of the small animal is positioned inside of the apparatus.

2. An apparatus in accordance with claim 1, wherein said jet water current generator comprises at least one of jet water output port connected with water supply pressure pump.

3. An apparatus in accordance with claim 1, wherein said jet water current generator comprises at least one of pulsator driven by electric motor.

4. An apparatus in accordance with claim 1, wherein said movable lid is detachably inserted to guide grooves formed by two opposite ends of said top panel, said both opposite ends are substantially perpendicular to an end on which said notch is disposed, said movable lid can be slided and fixed by a fixing device.

5. An apparatus in accordance with claim 4, wherein said filter comprises a rough filter detachably disposed to said drain port and a fine filter inserted extending from said drain port to a connection part between said drain port and a drain pipe.

6. An apparatus in accordance with claim 5 further comprising
   a fastener for fastening collar of small animal disposed to said outer case.

7. An apparatus in accordance with claim 6, wherein said fastener comprises
   a ring connected to a side wall of said outer case,
   a hanger for fixing said collar of small animal,
   a connecting rod for connecting said hanger to said ring.

8. An apparatus in accordance with claim 1, further comprising
   a water supplying port provided at a lower part of said washing tub, and connected to water supply pipe having a free end extending out of said outer case.

9. An apparatus in accordance with claim 1, further comprising
   an outer shield mounted on top of said outer case in a manner to encircle opening of outer case.

10. An apparatus in accordance with claim 1, further comprising
    an outer shield mounted on top of said outer case in a manner to encircle opening of outer case, and
    an outer lid to be put on top opening of said outer shield for covering said top opening.

11. An apparatus in accordance with claim 1, wherein said first and second notches isolate the head of the animal form the rest of the body.

* * * * *